(12) United States Patent
Ma

(10) Patent No.: US 12,710,093 B2
(45) Date of Patent: Aug. 18, 2026

(54) MULTI-STAGE CHAIN TRANSMISSION STRUCTURE FOR AN ALL-TERRAIN KART

(71) Applicant: Liang Ma, Yangquan (CN)

(72) Inventor: Liang Ma, Yangquan (CN)

( * ) Notice: Subject to any disclaimer, the term of this patent is extended or adjusted under 35 U.S.C. 154(b) by 323 days.

(21) Appl. No.: 18/579,027

(22) PCT Filed: Oct. 27, 2022

(86) PCT No.: PCT/CN2022/127839
§ 371 (c)(1),
(2) Date: Jan. 12, 2024

(87) PCT Pub. No.: WO2023/103635
PCT Pub. Date: Jun. 15, 2023

(65) Prior Publication Data

US 2024/0318705 A1 Sep. 26, 2024

(30) Foreign Application Priority Data

Dec. 6, 2021 (CN) ........................ 202123038674.5

(51) Int. Cl.
*F16H 7/06* (2006.01)
*B60K 17/04* (2006.01)
*B62D 63/04* (2006.01)

(52) U.S. Cl.
CPC ............... *F16H 7/06* (2013.01); *B60K 17/04* (2013.01); *B62D 63/04* (2013.01)

(58) Field of Classification Search
CPC ........... F16H 7/06; F16H 1/006; B60K 17/04; B60K 17/043; B60K 17/00; B62D 63/04;
(Continued)

(56) References Cited

U.S. PATENT DOCUMENTS 7,000,727 B2 * 2/2006 Korenjak ............... B60K 17/04 180/56
9,656,672 B2 * 5/2017 Schieffelin ............. B60W 10/11
(Continued)

FOREIGN PATENT DOCUMENTS

CN 101024376 A 8/2007
CN 203832232 U * 9/2014
(Continued)

*Primary Examiner* — James A Shriver, II
*Assistant Examiner* — Ian Bryce Shelton

(57) ABSTRACT

A multi-stage chain transmission structure for an all-terrain kart, comprising: a first-stage chain-sprocket transmission combination (1) and a second-stage chain-sprocket transmission combination (2); a two-stage chain transmission structure, working in conjunction with an engine (3) on an independent suspension and steering knuckle transmission half-shaft combination of an all-terrain kart body; and a third-stage chain transmission structure, equipped with a chain transmission combination and working in conjunction on an upper position of an integral driving axle of a non-independent suspension. The unsprung mass of a driving axle is reduced, and the responsiveness of the driving axle and the comfort of a driver or passenger are improved. A box-free chain transmission system can adapt to a vertical engine, a horizontal engine and a gear engine, and can also work in conjunction with a common CVT engine, a special belt reverse gear CVT engine and the like as a power source.

8 Claims, 8 Drawing Sheets

(58) Field of Classification Search
CPC ........... B60Y 2200/114; B60Y 2200/20; Y02T 10/62; B62M 7/00; B62M 9/06
See application file for complete search history.

(56) References Cited

U.S. PATENT DOCUMENTS

| | | | | |
|---|---|---|---|---|
| 2002/0017418 | A1* | 2/2002 | Korenjack ............. | B60K 17/04 180/311 |
| 2002/0063011 | A1* | 5/2002 | Montague ................ | B60G 9/02 180/350 |
| 2009/0223730 | A1* | 9/2009 | Arnold ................. | B62K 25/283 180/231 |
| 2012/0080249 | A1* | 4/2012 | Yates, III ................ | B60L 50/90 701/22 |

FOREIGN PATENT DOCUMENTS

| | | | | | |
|---|---|---|---|---|---|
| CN | 204160619 | U | * | 2/2015 | |
| CN | 105299158 | A | * | 2/2016 | ............. H02K 7/116 |
| CN | 206206524 | U | * | 5/2017 | |
| CN | 206623957 | U | * | 11/2017 | |
| CN | 107917169 | A | * | 4/2018 | ............... F16H 7/06 |
| CN | 109435686 | A | | 3/2019 | |
| CN | 109552036 | A | * | 4/2019 | ............. B60K 17/00 |
| CN | 110217103 | A | * | 9/2019 | ........... B60K 17/342 |
| CN | 112829579 | A | | 5/2021 | |
| CN | 113103865 | A | * | 7/2021 | ............. B60K 17/04 |
| CN | 113442721 | A | | 9/2021 | |
| CN | 114194326 | A | | 3/2022 | |
| EP | 1479497 | A2 | * | 11/2004 | ........... B28C 5/0837 |
| KR | 20120079893 | A | * | 7/2012 | .............. B62M 9/06 |
| KR | 20210063100 | A | * | 6/2021 | .............. B62M 9/06 |
| WO | WO-2018234985 | A1 | * | 12/2018 | ............. B60K 6/543 |

* cited by examiner

MULTI-STAGE CHAIN TRANSMISSION STRUCTURE FOR AN ALL-TERRAIN KART

1. TECHNICAL FIELD

The invention relates to the technical field of karts, in particular to a multi-stage chain transmission structure for an all-terrain kart.

2. BACKGROUND ART

Go-karting originated in Eastern Europe in the 1940s and gained popularity and rapid development in Europe and America by the late 1950s. Due to its easy driving, safety, and thrilling characteristics, it quickly became popular worldwide. The structure of a go-kart is very simple, consisting of a steel tube frame, pedals of a steering system, a fuel tank, a protective cover for transmission chain, a driver's seat, and a bumper for collision protection.

The existing all-terrain karts have a rear drive axle that installs the engine and rear suspension into an integral structure, however, this type of drive axle is not well suitable for off-road conditions and cannot guarantee the comfort of the driver and passengers. Therefore, it is imperative to design a new transmission structure for karts that has excellent performance, high transmission efficiency, can adapt to off-road driving conditions, and also ensures the comfort of the driver and passengers.

3. SUMMARY OF THE INVENTION

In order to solve these existing problems, the invention provides a multi-stage chain transmission structure for an all-terrain kart, the invention is realized by the following technical scheme:

A multi-stage chain transmission structure for an all-terrain kart, the multi-stage chain transmission structure for an all-terrain kart comprises a first-stage chain-sprocket transmission combination and a second-stage chain-sprocket transmission combination; a two-stage chain transmission structure, working in conjunction with an engine on an independent suspension and steering knuckle transmission half-shaft combination of an all-terrain kart body; and a third-stage chain transmission structure, equipped with a chain transmission combination and working in conjunction on an upper position of an integral driving axle of a non-independent suspension; the multi-stage chain transmission structure comprises the two-stage chain transmission structure, when the second-stage sprocket-chain transmission combination is not used, the first-stage chain-sprocket transmission is working in conjunction with the engine on the upper position of the integral driving axle of the non-independent suspension of the all-terrain kart body, and equipped with the chain transmission combination.

Further, the engine comprises a vertical or horizontal engine that outputs power to the left side through the output shaft; a small sprocket is installed on the output shaft of the engine, the first-stage chain transmission support bracket, which is installed in a horizontal position, meshes the small sprocket with the sprocket on the coaxial spline through a chain, so as to form the first-stage chain-sprocket transmission combination, this coaxial spline is installed on the left or right of the coaxial articulated bearing seat on the first-stage chain transmission support bracket, which is installed on the rear fixed support of the engine; The bearing holes in the coaxial articulated bearing seat on the first-stage chain transmission support bracket, which is installed on the rear fixed support of the engine, and the Y-shaped coaxial articulated bearing seat on the coaxially mounted second-stage chain transmission support bracket have a coaxial spline shaft passing through them, and two sprockets are installed on the spline grooves at both ends of the coaxial shaft; the sprocket located on the left side is kept in the same vertical plane as the small sprocket on the output shaft of the engine; the sprocket located on the right side is kept in the same vertical plane as the large sprocket installed on a Rzeppa constant velocity universal joint shaft bearing, which is located on the right side of the universal joint bearing seat at the end of the second-stage chain transmission support frame.

Further, the engine comprises a kart-specific CVT engine or electric motor that outputs power to the right side through the output shaft; the sprocket installed on the right side of the coaxial articulated shaft of the first-stage and second-stage chain transmission support frames, which are installed on the rear horizontal position of the special fixed support for the kart-specific CVT engine or electric motor or at the vertical position below the special fixed support, is kept in the same vertical plane as the small sprocket installed on the right output shaft of the kart-specific CVT engine or electric motor.

Further, the axis center of the coaxial articulated bearing seat installed at the end of the first-stage chain transmission support frame, which is fixedly installed at the vertical position below the special fixed support for the kart-specific CVT engine or electric motor, is kept in the same vertical plane as the axis center of the output shaft of a CVT engine or electric motor, and the two axes are kept parallel, the vertically installed chain and first-stage chain transmission combination form an integral structure with the kart-specific CVT engine or electric motor.

Further, the bearing holes in the coaxial articulated bearing seat on the first-stage chain transmission support bracket, which is installed in a horizontal or vertical position on the special fixed support for the kart-specific CVT engine or electric motor, and the Y-shaped coaxial articulated bearing seat on the coaxially mounted second-stage chain transmission support bracket have a coaxial spline shaft passing through them, the left and right sprockets are respectively installed on the spline grooves at both ends of the spline coaxial shaft; the sprocket located on the right side is kept in the same vertical plane as the small sprocket on the output shaft on the right side of the kart-specific CVT engine or electric motor, and the two sprockets on the right side are meshed with a chain; the sprocket located on the left side is kept in the same vertical plane as the large sprocket installed on a Rzeppa constant velocity universal joint shaft bearing, which is located on the left side of the universal joint bearing seat at the end of the second-stage chain transmission support frame, and the two sprockets on the left side are meshed with a chain;

The Y-shaped second-stage chain transmission support frame can rotate around the articulated coaxial axis together with the installed chain to a vertical angle position, and can also rotate to a horizontal angle position or any angle position to transmit power.

Further, the lengthened first-stage chain-sprocket transmission support frame are adjusted to a suitable angular position and welded to a special fixed support for the CVT engine or electric motor to form an integral structure; the axis center of the lengthened horizontal first-stage chain transmission support frame, which is welded at the rear position of the special fixed support, and the universal joint bearing seat welded at its end, is at the same height as the axis center of the end output shaft of the CVT engine or electric motor, and the two axes are parallel; the axis center of the lengthened vertical first-stage chain transmission support frame, which is welded at the lower position of the special fixed support, and the universal joint bearing seat welded at its end, is kept in the same vertical plane as the axis center of the end output shaft of the CVT engine or electric motor, and the two axes are kept parallel in the vertical plane;

According to the actual situation, the axis center of the lengthened vertical first-stage chain transmission support frame in the appropriate angular position, which is welded at the special fixed support for the CVT engine or electric motor, and the universal joint bearing seat welded at its end, is needed to keep in the same angle plane as the axis center of the end output shaft of the CVT engine or electric motor, and the two axes are needed to be parallel in the same angle plane;

Left and right Rzeppa constant velocity universal joint heads are installed outside the universal joint bearing seat at the end of the lengthened first-stage chain transmission support frame; the large sprocket installed on the right universal joint shaft, which is kept in the same vertical plane as the small sprocket, which is installed on the right output shaft of the CVT engine or electric motor, and the two sprockets are meshed with a chain, the center screw in the universal joint shaft fastens the left and right universal joint heads to the bearings in the bearing seat.

Further, the left and right Rzeppa constant velocity universal joint heads can be simultaneously installed with the left and right transmission half-shafts, the two transmission half-shafts are connected with the telescopic Rzeppa constant velocity universal joint heads, which are installed on the left and right steering knuckles of the independent suspension, this transmission structure is suitable for the transmission mode of the independent suspension, with the option to install a differential between the left and right universal joint heads;

The left and right Rzeppa constant velocity universal joint heads can be simultaneously installed with the left and right transmission half-shafts to transmit power to the left and right sides, according to the transmission needs of the vehicle, a single transmission half-shaft can be installed inside the left universal joint head, extending to the left to the chain transmission combination at the left end of the integral drive axle tube, and transmitting power to the right extended Rzeppa constant velocity universal joint head; a single transmission half-shaft can be installed inside the right Rzeppa constant velocity universal joint head, extending to the right to the chain transmission combination at the right end of the integral drive axle tube, and transmitting power to the left extended Rzeppa constant velocity universal joint head, this structure cannot install a differential between the left and right universal joint heads, and is suitable for the transmission of the non-independent suspension.

Further, the integral drive axle tube is composed of an integral axle tube, a driving rigid shaft installed in the axle tube, a bearing seat of a universal joint and a small sprocket combination installed at the end of the side of axle tube, an H-shaped support seat for mounting the bearing seat, vertical and horizontal push-pull rod seats, a fixed support for a brake pump, a large sprocket installed on the driving rigid shaft, brake discs, wheel hubs, tires, no differential is installed between the driving rigid shafts; welding the bearing seat of a universal joint and a small sprocket combination and H-shaped support seat to the left end of the integral drive axle tube, and the small sprocket with the universal joint head extending to the right is installed at the end of the outer universal joint shaft on the left side of the bearing seat, keeping the large sprocket and the small sprocket in the same vertical plane and using a chain to mesh the two sprockets to form the chain transmission combination on the left side of the integral drive axle, and working in conjunction with the transmission half-shaft to transmit power to the left; welding the bearing seat of a universal joint and a small sprocket combination and H-shaped support seat to the right end of the integral drive axle tube, and the small sprocket with the universal joint head extending to the left is installed at the end of the outer universal joint shaft on the right side of the bearing seat, installing the large sprocket on the driving rigid shaft outside the right end of the drive axle tube, keeping the large sprocket and the small sprocket in the same vertical plane and using a chain to mesh the two sprockets to form the chain transmission combination on the right side of the integral drive axle, and working in conjunction with the transmission half-shaft to transmit power to the right;

The axis center of the bearing seat of the universal joint and the small sprocket combination and the axis center of the driving rigid shaft in the integral drive axle tube are maintained at the same horizontal installation position, in addition, the two axes should be parallel in the same horizontal plane with a suitable installation distance between them to ensure that there is no interference when the combined large and small sprockets of the two axes are in transmission.

The invention has the following advantageous effects: the engine and the drive axle are installed separately, and the engine is installed on the frame, which reduces the unsprung mass of the drive axle, and improves the responsiveness of the driving axle and the comfort of a driver or passenger; a box-free chain transmission system can adapt to a vertical engine, a horizontal engine and a gear engine, and can also work in conjunction with a common CVT engine, a special belt reverse gear CVT engine and the like as a power source.

4. BRIEF DESCRIPTION OF ACCOMPANY DRAWINGS

5. SPECIFIC EMBODIMENT OF THE INVENTION

Figure 1:
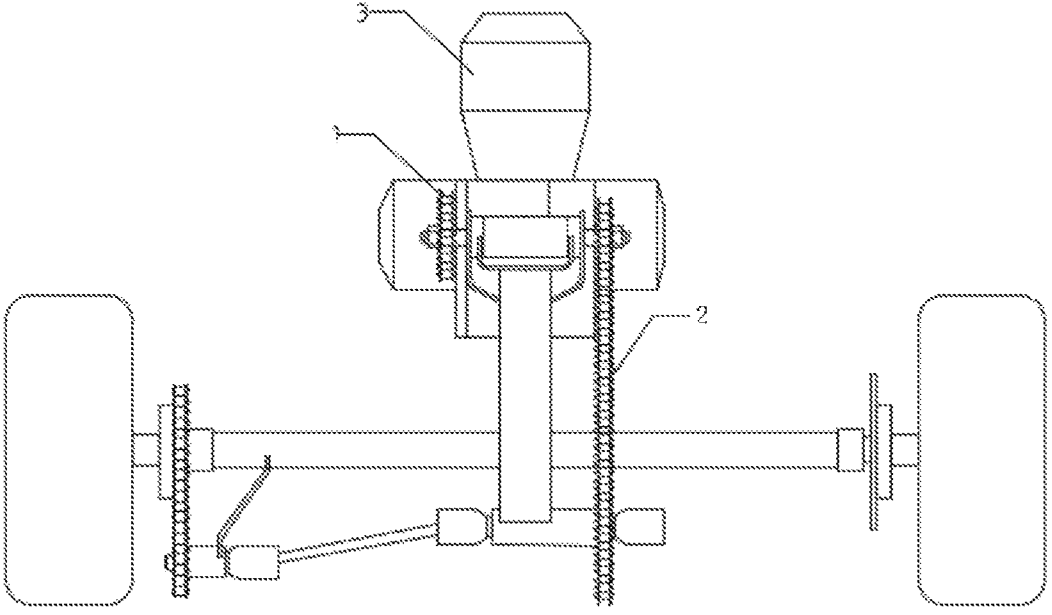
FIG. 1 is a rear view of the chain-sprocket transmission applied to the integral rear drive axle.
Figure 2:
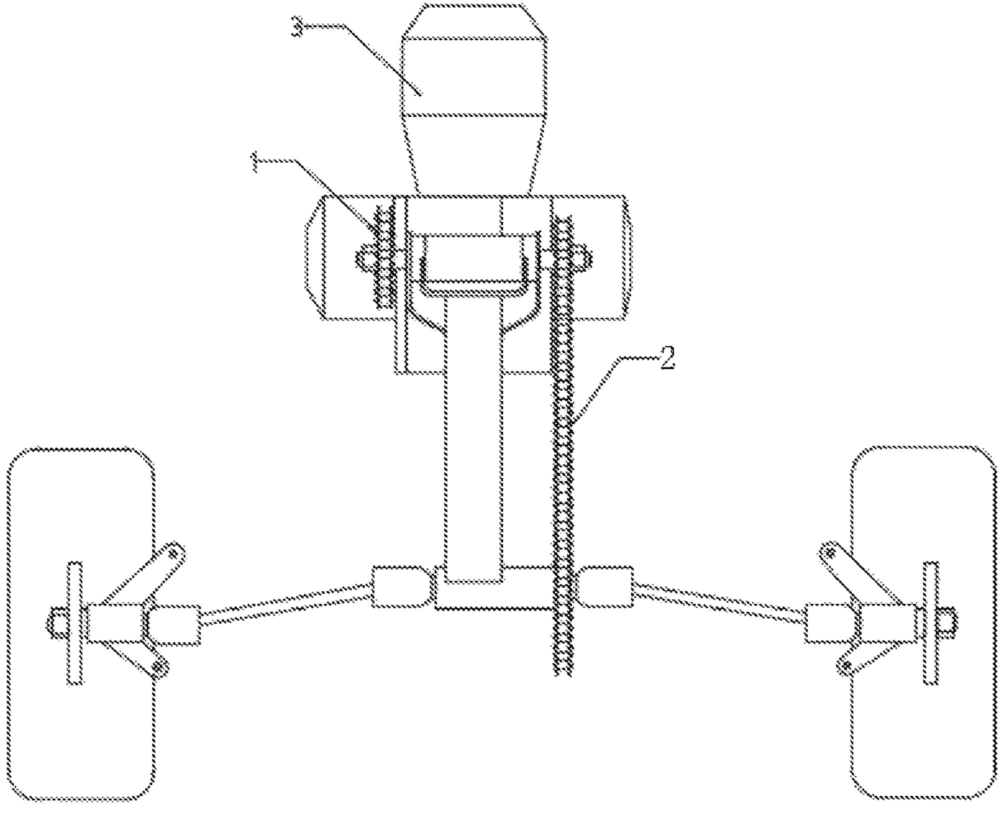
FIG. 2 is a rear view of the chain-sprocket transmission applied to the independent suspension.
Figure 3:
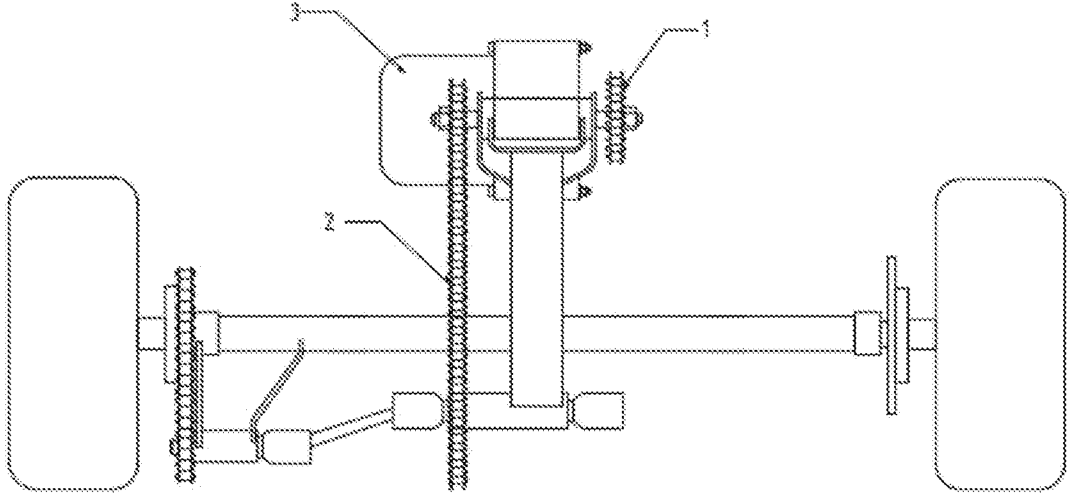
FIG. 3 is a left view of the chain-sprocket transmission method with the support frame structure.
Figure 4:
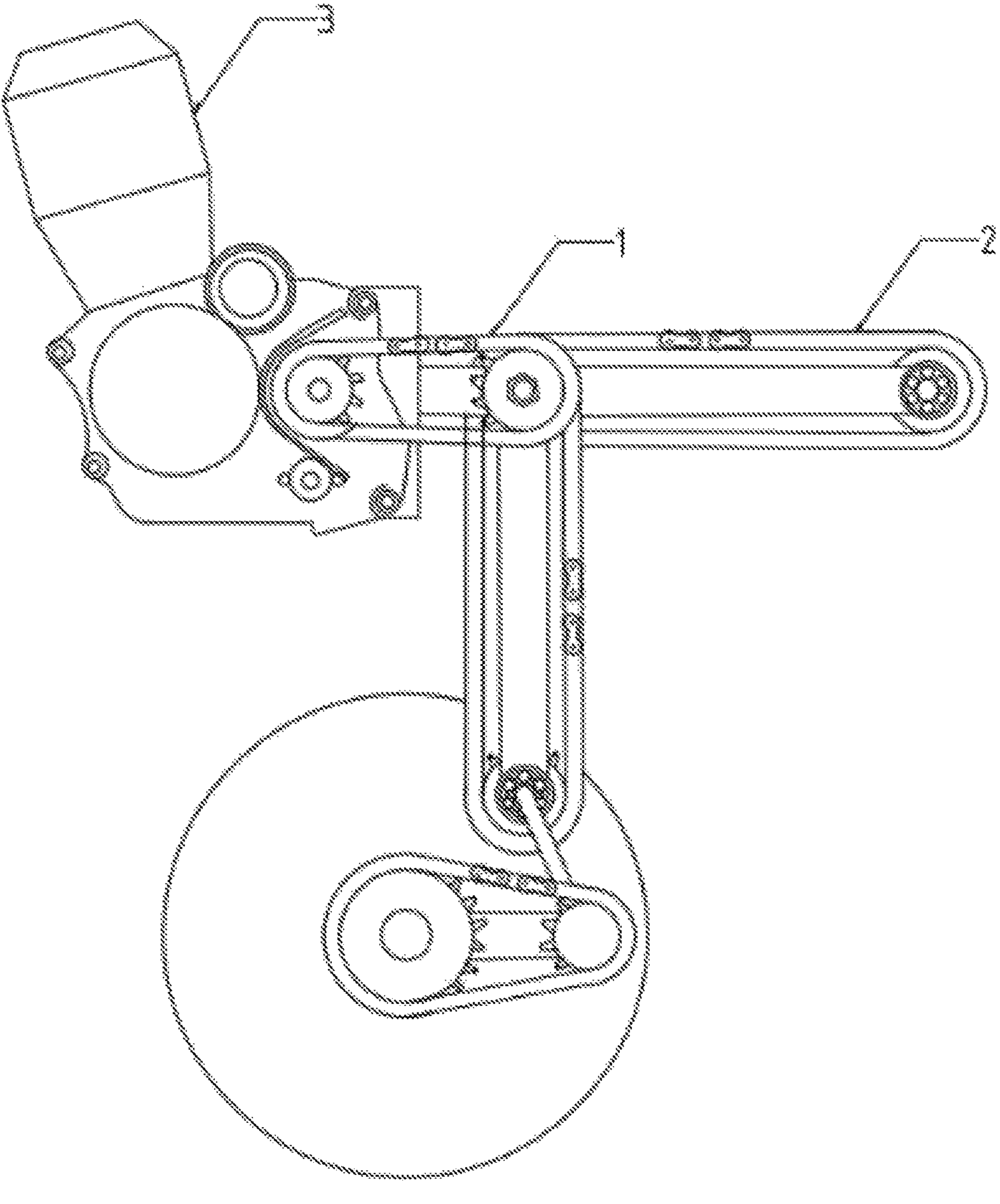
FIG. 4 is a structural diagram of the kart-specific CVT engine or frequency conversion motor working in conjunction with the two-stage chain transmission.
Figure 5:
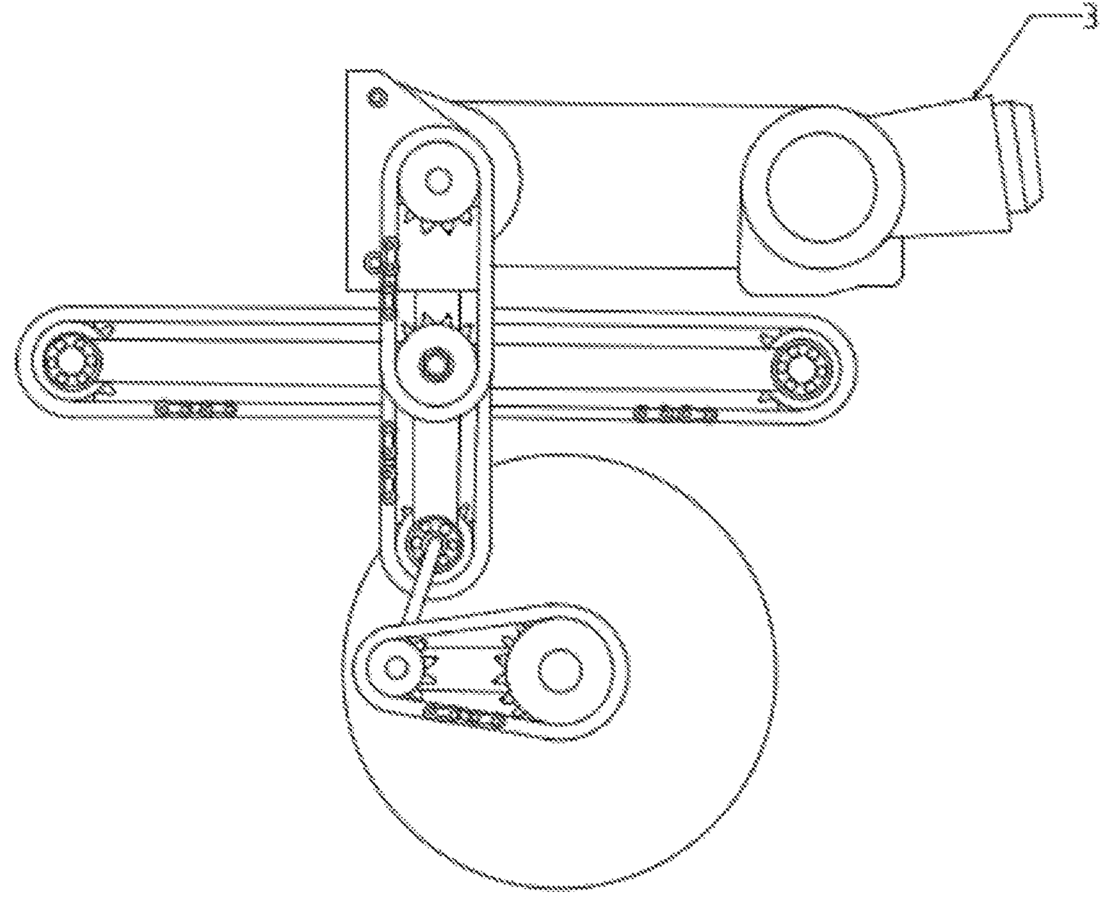
FIG. 5 is a right view of the two-stage chain transmission structure installed under the special fixed support of the CVT engine or frequency conversion motor when it is applied to the integral drive rigid axle and independent suspension.
Figure 6:
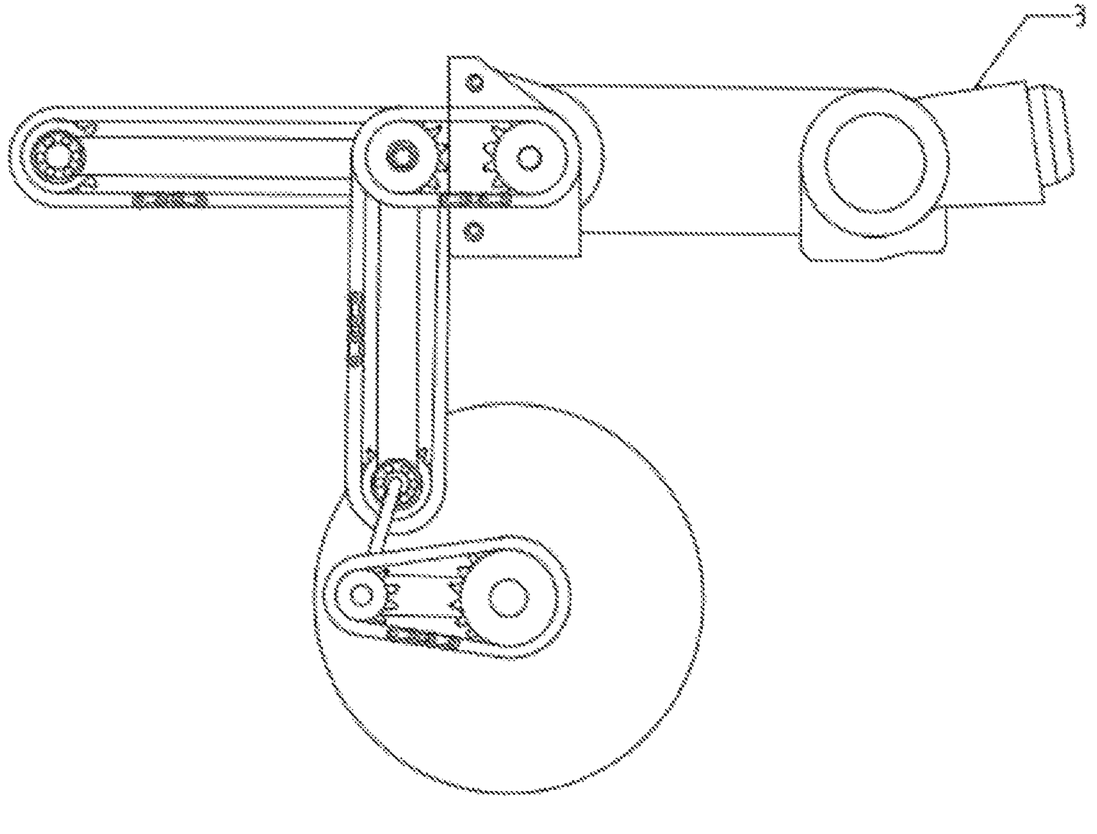
FIG. 6 is a right view of the two-stage chain transmission structure installed at the rear of the special fixed support of the CVT engine or frequency conversion motor when it is applied to the integral drive rigid axle and independent suspension.
Figure 7:
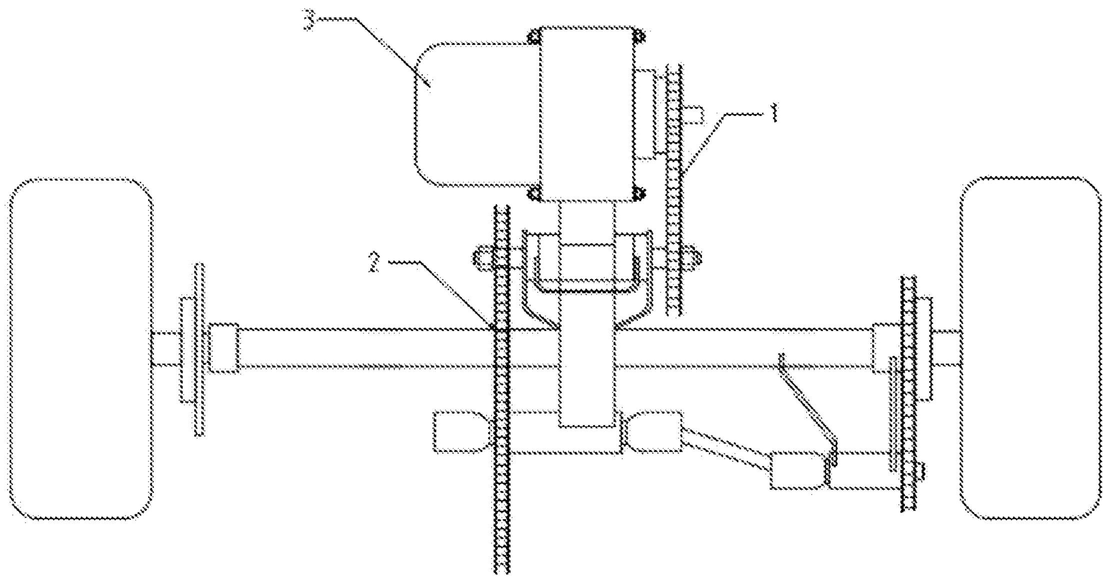
FIG. 7 is a rear view of the three-stage chain transmission combination used in a kart applied to the integral drive axle.
Figure 8:
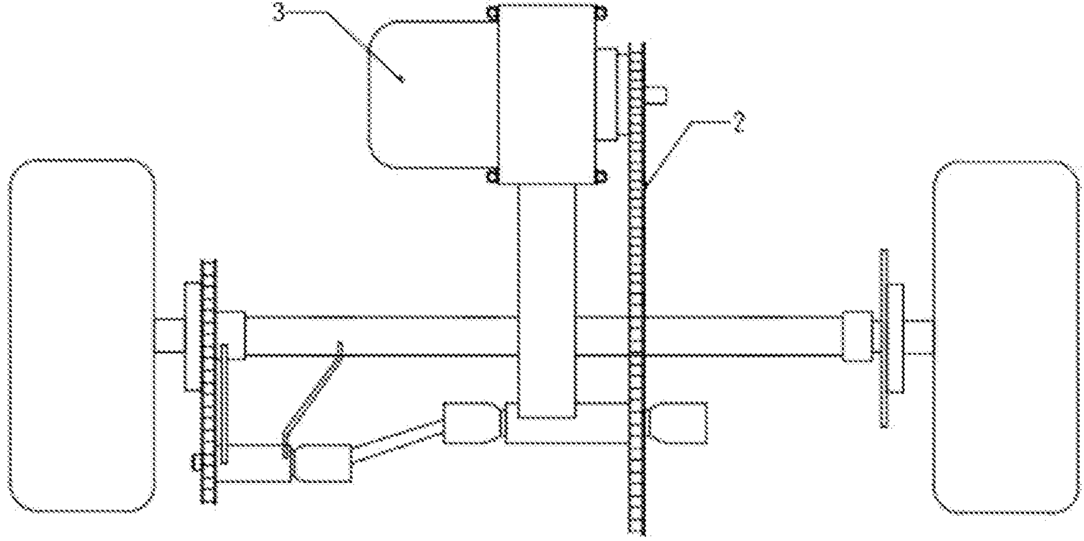
FIG. 8 is a rear view of the two-stage chain transmission combination used in a kart applied to the integral drive axle.

The technical scheme of the invention will be described in more detail and completely below in combination with the accompanying drawings.

In the description of the invention, it should be understood that the orientation or positional relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and so on are based on the orientation or positional relationship shown in the accompanying drawings, or the orientation or positional relationship that product of the invention is usually placed in when it is used, only for the convenience of describing the invention and simplifying the description, rather than indicating or implying that the indicated device or element must have a specific orientation, as well as a specific orientation structure and operation, therefore, it should not be construed as a limitation of the invention.

In addition, the terms of "first", "second" and so on are only used to describe the object, and should not be construed as indicating or implying relative importance. Therefore, features defined as "first" and "second" may explicitly or implicitly include one or more of these features. In the description of the invention, "plurality" means two or more, unless otherwise clearly and specifically limited.

Embodiment 1, a multi-stage chain transmission structure for an all-terrain kart, the multi-stage chain transmission structure for an all-terrain kart comprises a first-stage chain-sprocket transmission combination 1 and a second-stage chain-sprocket transmission combination 2; a two-stage chain transmission structure, working in conjunction with an engine 3 on an independent suspension and steering knuckle transmission half-shaft combination of an all-terrain kart body; and a third-stage chain transmission structure, equipped with a chain transmission combination and working in conjunction on an upper position of an integral driving axle of a non-independent suspension; the multi-stage chain transmission structure comprises the two-stage chain transmission structure, when the second-stage sprocket-chain transmission combination is not used, the first-stage chain-sprocket transmission is working in conjunction with the engine on the upper position of the integral driving axle of the non-independent suspension of the all-terrain kart body, and equipped with the chain transmission combination.

The engine 3 comprises a vertical or horizontal engine that outputs power to the left side through the output shaft; a small sprocket is installed on the output shaft of the engine 3, the first-stage chain transmission support bracket, which is installed in a horizontal position, meshes the small sprocket with the sprocket on the coaxial spline through a chain, so as to form the first-stage chain-sprocket transmission combination, this coaxial spline is installed on the left or right of the coaxial articulated bearing seat on the first-stage chain transmission support bracket, which is installed on the rear fixed support of the engine 3; The bearing holes in the coaxial articulated bearing seat on the first-stage chain transmission support bracket, which is installed on the rear fixed support of the engine, and the Y-shaped coaxial articulated bearing seat on the coaxially mounted second-stage chain transmission support bracket have a coaxial spline shaft passing through them, and two sprockets are installed on the spline grooves at both ends of the coaxial shaft; the sprocket located on the left side is kept in the same vertical plane as the small sprocket on the output shaft of the engine; the sprocket located on the right side is kept in the same vertical plane as the large sprocket installed on a Rzeppa constant velocity universal joint shaft bearing, which is located on the right side of the universal joint bearing seat at the end of the second-stage chain transmission support frame.

The engine comprises a kart-specific CVT engine or electric motor that outputs power to the right side through the output shaft; the sprocket installed on the right side of the coaxial articulated shaft of the first-stage and second-stage chain transmission support frames, which are installed on the rear horizontal position of the special fixed support for the kart-specific CVT engine or electric motor or at the vertical position below the special fixed support, is kept in the same vertical plane as the small sprocket installed on the right output shaft of the kart-specific CVT engine or electric motor.

The axis center of the coaxial articulated bearing seat installed at the end of the first-stage chain transmission support frame, which is fixedly installed at the vertical position below the special fixed support for the kart-specific CVT engine or electric motor, is kept in the same vertical plane as the axis center of the output shaft of a CVT engine or electric motor, and the two axes are kept parallel, the vertically installed chain and first-stage chain transmission combination form an integral structure with the kart-specific CVT engine or electric motor.

The bearing holes in the coaxial articulated bearing seat on the first-stage chain transmission support bracket, which is installed in a horizontal or vertical position on the special fixed support for the kart-specific CVT engine or electric motor, and the Y-shaped coaxial articulated bearing seat on the coaxially mounted second-stage chain transmission support bracket have a coaxial spline shaft passing through them, the left and right sprockets are respectively installed on the spline grooves at both ends of the spline coaxial shaft; the sprocket located on the right side is kept in the same vertical plane as the small sprocket on the output shaft on the right side of the kart-specific CVT engine or electric motor, and the two sprockets on the right side are meshed with a chain; the sprocket located on the left side is kept in the same vertical plane as the large sprocket installed on a Rzeppa constant velocity universal joint shaft bearing, which is located on the left side of the universal joint bearing seat at the end of the second-stage chain transmission support frame, and the two sprockets on the left side are meshed with a chain; The Y-shaped second-stage chain transmission support frame can rotate around the articulated coaxial axis together with the installed chain to a vertical angle position, and can also rotate to a horizontal angle position or any angle position to transmit power.

The lengthened first-stage chain-sprocket transmission support frame are adjusted to a suitable angular position and welded to a special fixed support for the CVT engine or electric motor to form an integral structure; the axis center of the lengthened horizontal first-stage chain transmission support frame, which is welded at the rear position of the special fixed support, and the universal joint bearing seat welded at its end, is at the same height as the axis center of the end output shaft of the CVT engine or electric motor, and the two axes are parallel; the axis center of the lengthened vertical first-stage chain transmission support frame, which is welded at the lower position of the special fixed support, and the universal joint bearing seat welded at its end, is kept in the same vertical plane as the axis center of the end output shaft of the CVT engine or electric motor, and the two axes are kept parallel in the vertical plane; According to the actual situation, the axis center of the lengthened vertical first-stage chain transmission support frame in the appropriate angular position, which is welded at the special fixed support for the CVT engine or electric motor, and the universal joint bearing seat welded at its end, is needed to keep in the same angle plane as the axis center of the end output shaft of the CVT engine or electric motor, and the two axes are needed to be parallel in the same angle plane;

Left and right Rzeppa constant velocity universal joint heads are installed outside the universal joint bearing seat at the end of the lengthened first-stage chain transmission support frame; the large sprocket installed on the right universal joint shaft, which is kept in the same vertical plane as the small sprocket, which is installed on the right output shaft of the CVT engine or electric motor, and the two sprockets are meshed with a chain, the center screw in the universal joint shaft fastens the left and right universal joint heads to the bearings in the bearing seat.

The left and right Rzeppa constant velocity universal joint heads can be simultaneously installed with the left and right transmission half-shafts, the two transmission half-shafts are connected with the telescopic Rzeppa constant velocity universal joint heads, which are installed on the left and right steering knuckles of the independent suspension, this transmission structure is suitable for the transmission mode of the independent suspension, with the option to install a differential between the left and right universal joint heads;

The left and right Rzeppa constant velocity universal joint heads can be simultaneously installed with the left and right transmission half-shafts to transmit power to the left and right sides, according to the transmission needs of the vehicle, a single transmission half-shaft can be installed inside the left universal joint head, extending to the left to the chain transmission combination at the left end of the integral drive axle tube, and transmitting power to the right extended Rzeppa constant velocity universal joint head; preferably, a single transmission half-shaft can be installed inside the right Rzeppa constant velocity universal joint head, extending to the right to the chain transmission combination at the right end of the integral drive axle tube, and transmitting power to the left extended Rzeppa constant velocity universal joint head, this structure cannot install a differential between the left and right universal joint heads, and is suitable for the transmission of the non-independent suspension.

The integral drive axle tube is composed of an integral axle tube, a driving rigid shaft installed in the axle tube, a bearing seat of a universal joint and a small sprocket combination installed at the end of the side of axle tube, an H-shaped support seat for mounting the bearing seat, vertical and horizontal push-pull rod seats, a fixed support for a brake pump, a large sprocket installed on the driving rigid shaft, brake discs, wheel hubs, tires, no differential is installed between the driving rigid shafts; welding the bearing seat of a universal joint and a small sprocket combination and H-shaped support seat to the left end of the integral drive axle tube, and the small sprocket with the universal joint head extending to the right is installed at the end of the outer universal joint shaft on the left side of the bearing seat, keeping the large sprocket and the small sprocket in the same vertical plane and using a chain to mesh the two sprockets to form the chain transmission combination on the left side of the integral drive axle, and working in conjunction with the transmission half-shaft to transmit power to the left; welding the bearing seat of a universal joint and a small sprocket combination and H-shaped support seat to the right end of the integral drive axle tube, and the small sprocket with the universal joint head extending to the left is installed at the end of the outer universal joint shaft on the right side of the bearing seat, installing the large sprocket on the driving rigid shaft outside the right end of the drive axle tube, keeping the large sprocket and the small sprocket in the same vertical plane and using a chain to mesh the two sprockets to form the chain transmission combination on the right side of the integral drive axle, and working in conjunction with the transmission half-shaft to transmit power to the right;

The axis center of the bearing seat of the universal joint and the small sprocket combination and the axis center of the driving rigid shaft in the integral drive axle tube are maintained at the same horizontal installation position, in addition, the two axes should be parallel in the same horizontal plane with a suitable installation distance between them to ensure that there is no interference when the combined large and small sprockets of the two axes are in transmission.

The axis center of the coaxial articulated bearing seat on the first-stage chain transmission support bracket, which is fixedly installed on the rear fixed support of the engine, is at the same height as the axis center of the engine, and the two axes are parallel; the horizontally installed chain and first-stage chain transmission combination form an integral structure with the engine; the second-stage transmission chain and the Y-shaped second-stage chain transmission support frame installed on the coaxial articulated bearing seat can rotate around the articulated coaxial axis together with the installed chain to a vertical angle position, this is suitable for the integral rigid axle transmission of non-independent suspension, it can also be rotated to the horizontal position, this is suitable for the transmission structure of the steering knuckle of the independent suspension, thereby enabling the box-free chain transmission structure to achieve multi-angle and multi-range power transmission structures when using the second-stage chain transmission support frame, and when working in conjunction with the vertical engine, horizontal engine, and special belt reverse gear CVT engine.

Working principle of using vertical and horizontal engines as a power source:

The small sprocket installed on the end output shaft on the left side of the vertical and horizontal engines transmits power to the first-stage transmission chain that meshes with the small sprocket, the first-stage transmission chain transmits the power to the large chain that meshes with it; wherein, the large sprocket installed on the left side of the articulated coaxial axis, which is installed on the two-stage chain transmission support frame or support seat, transmits power to the small sprocket installed on the right side of the coaxially mounted articulated coaxial axis, this is the working principle of the first-stage chain transmission in the chain transmission system;

The small sprocket installed on the right side of the articulated coaxial axis transmits power to the second-stage transmission chain that meshes with it, the second-stage chain transmits power to the large sprocket, this large sprocket is installed on a Rzeppa constant velocity universal joint, which is located on the right side outside the bearing seat at the end of the second-stage chain transmission support frame, and this large sprocket is meshed with the transmission chain; the large sprocket drives the coaxially mounted Rzeppa constant velocity universal joints installed on the left and right sides outside the universal joint bearing seat at the end to rotate together; the rotating universal joints drive the transmission half-shaft on the left to transmit the power to the sliding track of the Rzeppa constant velocity universal joint head that extends to the right from the bearing seat of the universal joint and the small sprocket combination, this bearing seat is on the left side of the integral drive axle; the transmission half-shaft drives the universal joint to rotate together with the small sprocket, this small sprocket is installed on the universal joint spline shaft, which is located on the left side of the bearing seat;

The small sprocket drives the meshed chain and transmits the power to the large sprocket on the drive axle that is meshed with the chain, and rotates together; since the large sprocket is installed on the integral rigid shaft inside the drive axle tube, the large sprocket drives the integral rigid shaft to rotate in the axle tube, and drives the wheel hubs and tires installed at both ends of the rigid shaft to rotate at the same time;

The above constitutes the power transmission working principle of the new all-terrain kart when it is used in the vertical engine, the horizontal engine and the gear engine working in conjunction with the box-free two-stage chain transmission system to be applied to non-independent suspension.

The working principle of using the special belt reverse gear CVT engine as the power source:

The small sprocket installed on the end output shaft on the right side of the special belt reverse gear CVT engine transmits power to the first-stage transmission chain that meshes with the small sprocket, the first-stage transmission chain transmits the power to the large chain that meshes with it; wherein, the large sprocket installed on the right side of the articulated coaxial axis, which is installed on the two-stage chain transmission support frame or support seat, transmits power to the small sprocket installed on the left side of the coaxially mounted articulated coaxial axis, this is the working principle of the first-stage chain transmission in the chain transmission system;

The small sprocket installed on the left side of the articulated coaxial axis transmits power to the second-stage transmission chain that meshes with it, the second-stage chain transmits power to the large sprocket, this large sprocket is installed on a Rzeppa constant velocity universal joint, which is located on the left side outside the bearing seat at the end of the second-stage chain transmission support frame, and this large sprocket is meshed with the transmission chain; the large sprocket installed on the left side outside the end bearing seat drives the coaxially mounted constant velocity universal joints installed on the left and right sides outside the bearing seat to rotate together;

The above constitutes the power transmission working principle of the new all-terrain kart equipped with the special belt reverse gear CVT engine and the box-free two-stage chain transmission system.

The working principle of the transmission system when applied to independent suspension:

The working principle of the vertical or horizontal engine and the special belt reverse gear CVT engine transmitting the power output to the mounted Rzeppa constant velocity universal joints, which is installed on the left and right sides outside the bearing seat at the end of the second-stage chain transmission, is the same as working principle of the chain transmission system applied to the rigid axle drive of the non-independent suspension;

When the coaxially mounted Rzeppa constant velocity universal joints installed on the left and right sides outside the bearing seat at the end of the second-stage chain transmission frame drive, thereby driving the left and right transmission half-shafts installed in the Rzeppa constant velocity universal joints to transmit the power to the telescopic Rzeppa constant velocity universal joints, the universal joints are installed in the bearing seats of steering knuckles and outside the center of the Hatou flange and the spline hole that are shared with the wheel hubs and brake discs; the spline shaft of the Rzeppa constant velocity universal joints is inserted into the center of the Hatou flange and the spline hole, and it is tightened with a large nut, the rotating left and right transmission half-shafts drive the combined universal joints in the bearing seats of steering knuckles, Hatou flange together with the wheel hubs and tires to rotate; The above constitutes the working principle of the chain transmission system for transmitting power from the engine to the wheels when applied to independent suspension.

In the description of the invention, it should also be noted that the terms of "arrange", "install", "link", "connect", "fix", etc., should be generally understood unless there are specific restrictions or stipulations, for example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

In the invention, unless otherwise expressly stipulated and limited, the first feature being "above" or "below" the second feature may include direct contact between the first and second features, or may include the first and second features not being in direct contact but being in contact through other features between them. Furthermore, the first feature being "above", "over" and "on" the second feature include the first feature being directly above and diagonally above the second feature, or simply mean that the first feature has a higher level than the second feature. The first feature being "below", "under" and "underneath" the second feature include the first feature being directly below and diagonally below the second feature, or simply mean that the first feature has a lower level than the second feature.

In the description of this specification, the reference terms "one embodiment", "some embodiments", "example", "specific example" or "some examples" or the like mean that the specific feature, structure, material, or characteristic described in connection with the embodiment or example are included in at least one embodiment or example of the invention. In this specification, schematic representations of the above terms do not necessarily refer to the same embodiment or example. Furthermore, the specific feature, structure, material, or characteristic described may be combined in any suitable manner in any one or more embodiments or examples.

Without departing from the concept of the invention, any obvious changes and modifications shall fall within the protection scope of the invention. The above are only preferred embodiments of the invention and are not intended to limit the invention. Any modifications, equivalent substitutions and improvements made within the spirit and principles of the invention shall be included in the protection scope of the invention.

What is claimed is:

1. A multi-stage chain transmission structure for an all-terrain kart, the multi-stage chain transmission structure for an all-terrain kart comprises a first-stage chain-sprocket transmission combination and a second-stage chain-sprocket transmission combination; a two-stage chain transmission structure, working in conjunction with an engine on an independent suspension and steering knuckle transmission half-shaft combination of an all-terrain kart body; and a third-stage chain transmission structure, equipped with a chain transmission combination and working in conjunction on an upper position of an integral driving axle of a non-independent suspension; the multi-stage chain transmission structure comprises the two-stage chain transmission structure, when the second-stage chain-sprocket transmission combination is not used, the first-stage chain-sprocket transmission is working in conjunction with the engine on the upper position of the integral driving axle of the non-independent suspension of the all-terrain kart body, and equipped with the chain transmission combination.

2. The multi-stage chain transmission structure for an all-terrain kart of claim 1, the engine comprises a vertical or horizontal engine that outputs power to the left side through an output shaft; a small sprocket is installed on the output shaft of the engine, a first-stage chain transmission support bracket, which is installed in a horizontal position, meshes the small sprocket with the sprocket on the coaxial spline through a chain, so as to form the first-stage chain-sprocket transmission combination, this coaxial spline is installed on the left or right of the coaxial articulated bearing seat on the first-stage chain transmission support bracket, which is installed on the rear fixed support of the engine;

bearing holes in the coaxial articulated bearing seat on the first-stage chain transmission support bracket, which is installed on the rear fixed support of the engine, and a Y-shaped coaxial articulated bearing seat on a coaxially mounted second-stage chain transmission support bracket have a coaxial spline shaft passing through them, and two sprockets are installed on the spline grooves at both ends of the coaxial shaft; the sprocket located on the left side is kept in the same vertical plane as the small sprocket on the output shaft of the engine; the sprocket located on the right side is kept in the same vertical plane as a large sprocket installed on a Rzeppa constant velocity universal joint shaft bearing, which is located on the right side of the universal joint bearing seat at the end of a second-stage chain transmission support frame.

3. The multi-stage chain transmission structure for an all-terrain kart of claim 2, the engine comprises a kart-specific CVT engine or electric motor that outputs power to the right side through the output shaft; the sprocket installed on the right side of the coaxial articulated shaft of a first-stage and the second-stage chain transmission support frames, which are installed on the rear horizontal position of the special fixed support for the kart-specific CVT engine or electric motor or at the vertical position below the special fixed support, is kept in the same vertical plane as the small sprocket installed on the right output shaft of the kart-specific CVT engine or electric motor.

4. The multi-stage chain transmission structure for an all-terrain kart of claim 3, an axis center of the coaxial articulated bearing seat installed at the end of the first-stage chain transmission support frame, which is fixedly installed at the vertical position below the special fixed support for the kart-specific CVT engine or electric motor, is kept in the same vertical plane as the axis center of the output shaft of a CVT engine or electric motor, and the two axes are kept parallel, the vertically installed chain and first-stage chain transmission combination form an integral structure with the kart-specific CVT engine or electric motor.

5. The multi-stage chain transmission structure for an all-terrain kart of claim 3, the bearing holes in the coaxial articulated bearing seat on the first-stage chain transmission support bracket, which is installed in a horizontal or vertical position on the special fixed support for the kart-specific CVT engine or electric motor, and the Y-shaped coaxial articulated bearing seat on the coaxially mounted second-stage chain transmission support bracket have a coaxial spline shaft passing through them, the left and right sprockets are respectively installed on the spline grooves at both ends of the spline coaxial shaft; the sprocket located on the right side is kept in the same vertical plane as the small sprocket on the output shaft on the right side of the kart-specific CVT engine or electric motor, and the two sprockets on the right side are meshed with a chain; the sprocket located on the left side is kept in the same vertical plane as the large sprocket installed on a Rzeppa constant velocity universal joint shaft bearing, which is located on the left side of the universal joint bearing seat at the end of the second-stage chain transmission support frame, and the two sprockets on the left side are meshed with a chain;

the Y-shaped second-stage chain transmission support frame can rotate around the articulated coaxial axis together with the installed chain to a vertical angle position, and can also rotate to a horizontal angle position or any angle position to transmit power.

6. The multi-stage chain transmission structure for an all-terrain kart of claim 5, the lengthened first-stage chain-sprocket transmission support frame are adjusted to a suitable angular position and welded to a special fixed support for the CVT engine or electric motor to form an integral structure; the axis center of the lengthened horizontal first-stage chain transmission support frame, which is welded at the rear position of the special fixed support, and the universal joint bearing seat welded at its end, is at the same height as the axis center of the end output shaft of the CVT engine or electric motor, and the two axes are parallel; the axis center of the lengthened vertical first-stage chain transmission support frame, which is welded at the lower position of the special fixed support, and the universal joint bearing seat welded at its end, is kept in the same vertical plane as the axis center of the end output shaft of the CVT engine or electric motor, and the two axes are kept parallel in the vertical plane;

according to the actual situation, the axis center of the lengthened vertical first-stage chain transmission support frame in the appropriate angular position, which is welded at the special fixed support for the CVT engine or electric motor, and the universal joint bearing seat welded at its end, is needed to keep in the same angle plane as the axis center of the end output shaft of the CVT engine or electric motor, and the two axes are needed to be parallel in the same angle plane;

left and right Rzeppa constant velocity universal joint heads are installed outside the universal joint bearing seat at the end of the lengthened first-stage chain transmission support frame; the large sprocket installed on the right universal joint shaft, which is kept in the same vertical plane as the small sprocket, which is installed on the right output shaft of the CVT engine or electric motor, and the two sprockets are meshed with a chain, the center screw in the universal joint shaft fastens the left and right universal joint heads to the bearings in the bearing seat.

7. The multi-stage chain transmission structure for an all-terrain kart of claim 6, the left and right Rzeppa constant velocity universal joint heads can be simultaneously installed with the left and right transmission half-shafts, the two transmission half-shafts are connected with the telescopic Rzeppa constant velocity universal joint heads, which are installed on the left and right steering knuckles of the independent suspension, this transmission structure is suitable for the transmission mode of the independent suspension, with the option to install a differential between the left and right universal joint heads;

the left and right Rzeppa constant velocity universal joint heads can be simultaneously installed with the left and right transmission half-shafts to transmit power to the left and right sides, according to the transmission needs of the vehicle, a single transmission half-shaft can be installed inside the left universal joint head, extending to the left to the chain transmission combination at the left end of the integral drive axle tube, and transmitting power to the right extended Rzeppa constant velocity universal joint head; a single transmission half-shaft can be installed inside the right Rzeppa constant velocity universal joint head, extending to the right to the chain transmission combination at the right end of the integral drive axle tube, and transmitting power to the left extended Rzeppa constant velocity universal joint head, this structure cannot install a differential between the left and right universal joint heads, and is suitable for the transmission of the non-independent suspension.

8. The multi-stage chain transmission structure for an all-terrain kart of claim 7, the integral drive axle tube is composed of an integral axle tube, a driving rigid shaft installed in the axle tube, a bearing seat of a universal joint and a small sprocket combination installed at the end of the side of axle tube, an H-shaped support seat for mounting the bearing seat, vertical and horizontal push-pull rod seats, a fixed support for a brake pump, a large sprocket installed on the driving rigid shaft, brake discs, wheel hubs, tires, no differential is installed between the driving rigid shafts; welding the bearing seat of a universal joint and a small sprocket combination and H-shaped support seat to the left end of the integral drive axle tube, and the small sprocket with the universal joint head extending to the right is installed at the end of the outer universal joint shaft on the left side of the bearing seat, keeping the large sprocket and the small sprocket in the same vertical plane and using a chain to mesh the two sprockets to form the chain transmission combination on the left side of the integral drive axle, and working in conjunction with the transmission half-shaft to transmit power to the left; welding the bearing seat of a universal joint and a small sprocket combination and H-shaped support seat to the right end of the integral drive axle tube, and the small sprocket with the universal joint head extending to the left is installed at the end of the outer universal joint shaft on the right side of the bearing seat, installing the large sprocket on the driving rigid shaft outside the right end of the drive axle tube, keeping the large sprocket and the small sprocket in the same vertical plane and using a chain to mesh the two sprockets to form the chain transmission combination on the right side of the integral drive axle, and working in conjunction with the transmission half-shaft to transmit power to the right;

the axis center of the bearing seat of the universal joint and the small sprocket combination and the axis center of the driving rigid shaft in the integral drive axle tube are maintained at the same horizontal installation position, in addition, the two axes should be parallel in the same horizontal plane with a suitable installation distance between them to ensure that there is no interference when the combined large and small sprockets of the two axes are in transmission.

* * * * *